United States Patent [19]
Cochran et al.

[11] 3,934,229
[45] Jan. 20, 1976

[54] EXTERNAL REGISTER MEMORY CHIP IN A CALCULATOR SYSTEM

[75] Inventors: Michael J. Cochran, Richardson; Charles P. Grant, Jr., Dallas, both of Tex.

[73] Assignee: Texas Instruments Incorporated, Dallas, Tex.

[22] Filed: Dec. 10, 1973

[21] Appl. No.: 423,355

[52] U.S. Cl. ............................................ 340/172.5
[51] Int. Cl.² .......................................... G06F 15/00
[58] Field of Search .......................... 340/172.5, 173

[56] References Cited
UNITED STATES PATENTS

| | | | |
|---|---|---|---|
| 3,579,201 | 5/1971 | Langley | 340/172.5 |
| 3,623,009 | 11/1971 | Ragen | 340/172.5 |
| 3,631,403 | 12/1971 | Asbo et al. | 340/172.5 |
| 3,656,131 | 4/1972 | Libby et al. | 340/172.5 |
| 3,691,538 | 9/1972 | Haney et al. | 340/173 |
| 3,760,171 | 9/1973 | Wang et al. | 340/172.5 |

*Primary Examiner*—Gareth D. Shaw
*Assistant Examiner*—Michael C. Sachs
*Attorney, Agent, or Firm*—Harold Levine; Edward J. Connors, Jr.; Stephen S. Sadacca

[57] ABSTRACT

Disclosed is a calculator having a basic pair of semiconductor chips respectively providing memory and computational functions and a third chip in combination therewith providing additional register and memory capacity. The basic chip pair generates system timing signals, flag signals and control signals which address the registers on the third chip and allow data to be written there into via the input/output data lines and data to be read therefrom via the input/output lines. The specific functions are effected upon the occurrence of the flag signal concurrently with a preselected timing signal.

10 Claims, 18 Drawing Figures

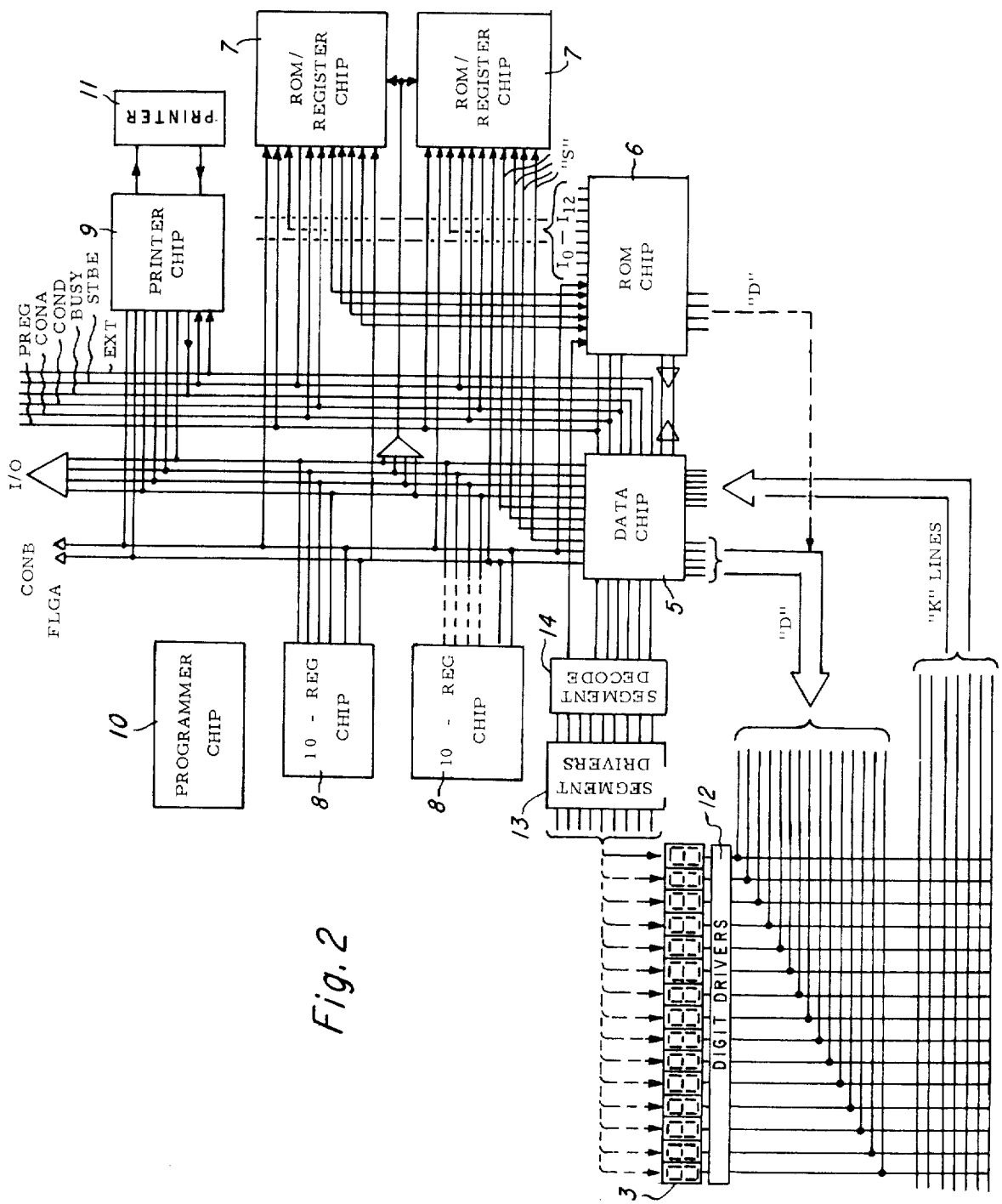

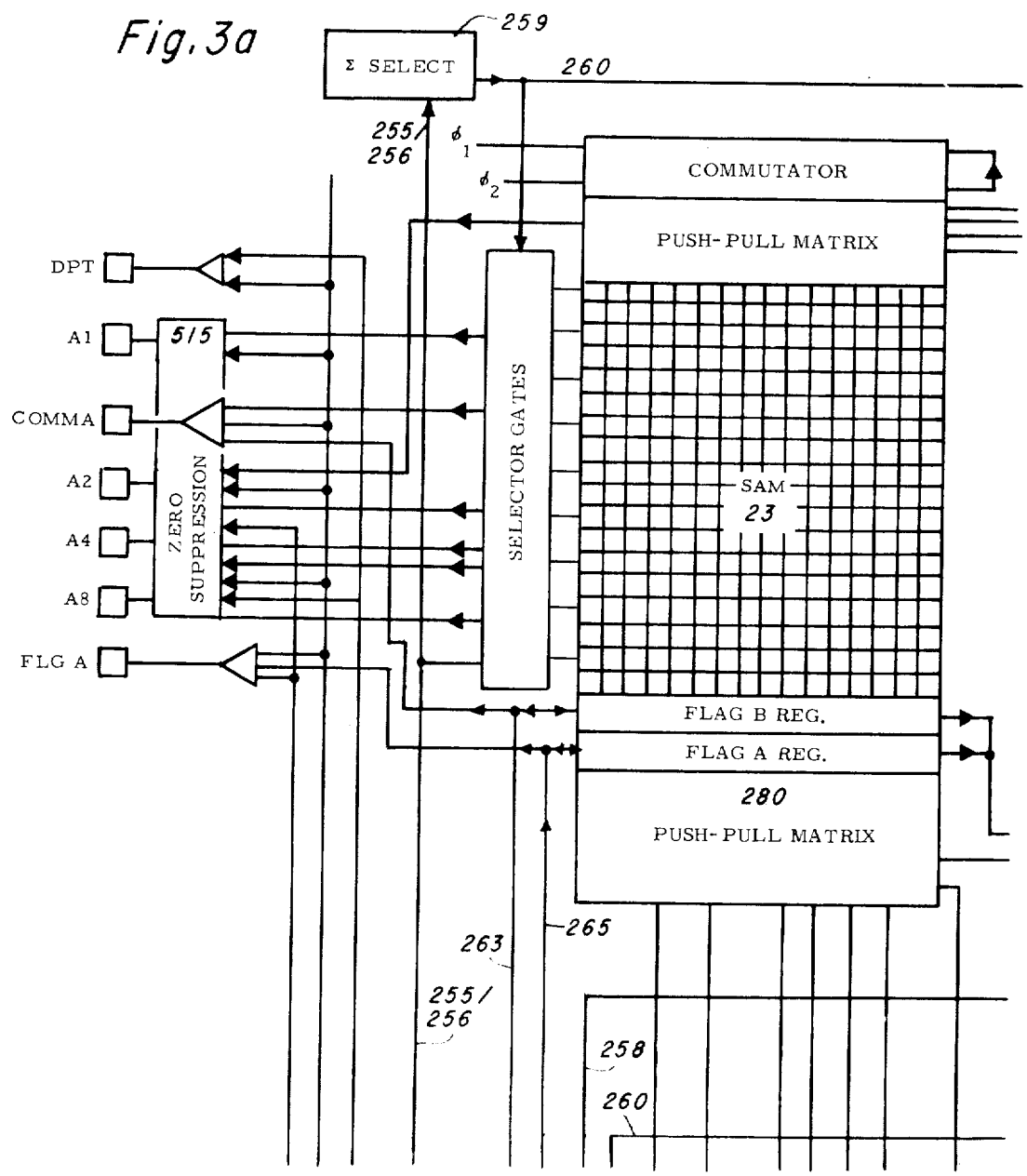

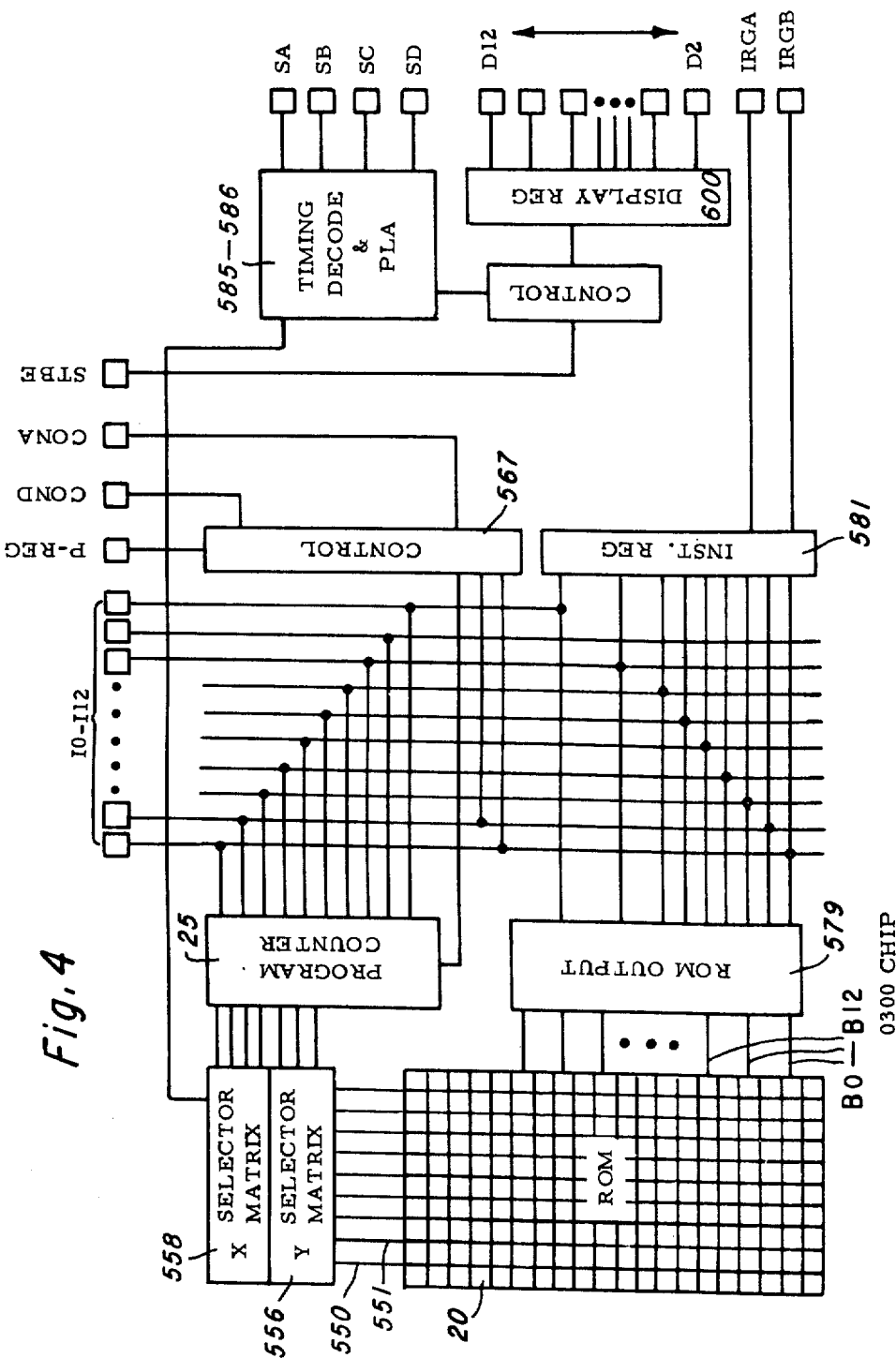

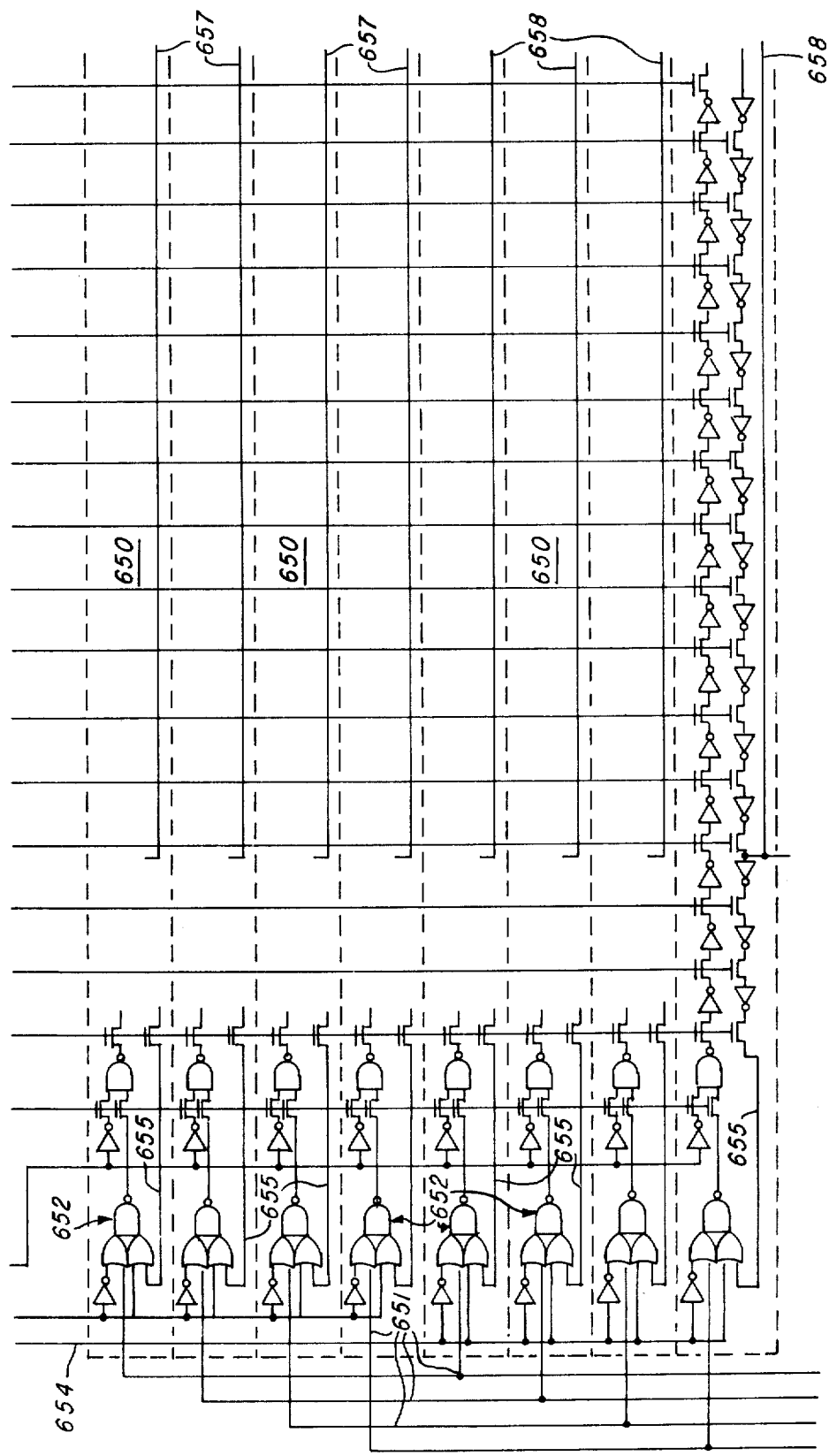

EXTERNAL REGISTER MEMORY CHIP IN A CALCULATOR SYSTEM

This application relates to data processing systems in general, and more specifically to calculator systems having additional data storage on a separate semiconductor chip. This application is related to copending patent application "Expandable Function Electronic Calculator", Ser. No. 360,984, filed May 16, 1973, by M. J. Cochran et al.

BACKGROUND OF THE INVENTION

Electronic desk top calculators have been changed in design due to the availability of MOS/LSI chips which allow the entire system to be embodied in only one or a small number of semiconductor devices. This technology permits large savings in manufacturing, labor and material costs and allows calculators to have operating functions not possible at reasonable cost in machines built from discrete devices or from large numbers of integrated circuits. A calculator system adapted to be implemented using only one MOS/LSI chip is set forth in copending application "Variable Function Calculator", Ser. No. 163,565 now abandoned, and replaced by Ser. No. 420,999, assigned to the assignee of this invention. A feature of the calculator disclosed in application Ser. No. 420,999 is the use of a random access memory array which is sequentially addressed to operate as a plurality of shift registers; this unit provides the main data registers in a space on the chip much less than needed for shift registers of conventional design. Another features of said application was the keyboard scanning technique.

The above referenced application, Ser. No. 360,984, provided an improved electronic calculator system adapted to be implemented in MOS/LSI technology of using several semiconductor chips or wafers. An expandable system included optional program memory arrays, external data registers and an output printer chip utilizing novel addressing techniques. Other features included use of the sequentially addressed memory set forth in copending application Ser. No. 420,999 with a timing arrangement in such a manner that auxiliary timing generators were not needed, and a keyboard interface register was provided which stored encoded keyboard and timing information for subsequent entry into the data registers or for selecting an address for the program memory. Application Ser. No. 360,984 disclosed the desirability of having a ROM/register chip and the advantages flowing therefrom.

It is therefore an object of the present invention to provide in a calculator system peripheral memory on a semiconductor chip which is addressed by a primary system. It is another object of the present invention to provide a peripheral data memory which is addressed by strategic communication of only a single flag signal coordinated with system status and timing signals. It is yet another object to provide a calculator system having a primary semiconductor chip set providing primary memory and computation functions and another chip interfacing therewith providing additional memory capacity and further to provide the method of addressing the chip by communicating a flag signal thereto at a selected system time prior to the data exchange on data lines.

It is yet another object to provide a method of addressing an suxiliary chip providing a plurality of functions in a multi-chip calculator system whereby the particular function supplied by the auxiliary chip is determined by communication of a flag signal to the auxiliary chip at a selected time in the system timing cycle.

Briefly and in accordance with the present invention, a calculator system is provided on a plurality of semiconductor integrated circuit chips with at least one of the chips providing peripheral instruction word and data storage. A flag signal at a preselected subcycle system time is generated on one of a primary set of chips and communicated in relationship to the system cycle timing to the peripheral chip for effecting addressing. Fifteen states are provided in the timing cycle which provides up to fifteen functions to be selected for execution on the peripheral chip. Communication of the flag signal during one state of the timing cycle indicates that data is to be written into a first register, and communication during a second state indicates that data is to be written into a second register and so on. Communication of the flag signal during another state of the timing cycle indicates that data is to be read from one of the registers, and communication of the flag signal at a subsequent state indicates that data is to be read from another register, and so forth, with provision for clearing all registers.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIG. 2 is a simplified block diagram of the expandable calculator system featuring the invention;

FIGS. 3a–3d are complex block diagrams of the data chip of FIG. 2;

FIG. 4 is a detailed block diagram of the ROM chip of FIG. 2;

FIGS. 7a–7c is a detailed schematic diagram of the Register part of the ROM/Register chip of the invention;

FIGS. 8a–8e is a composite schematic diagram of the circuit of the ROM chip of FIG. 2 also comprising the ROM part of the ROM/Register chip.

DETAILED DESCRIPTION OF SPECIFIC EMBODIMENT

Figure 1:
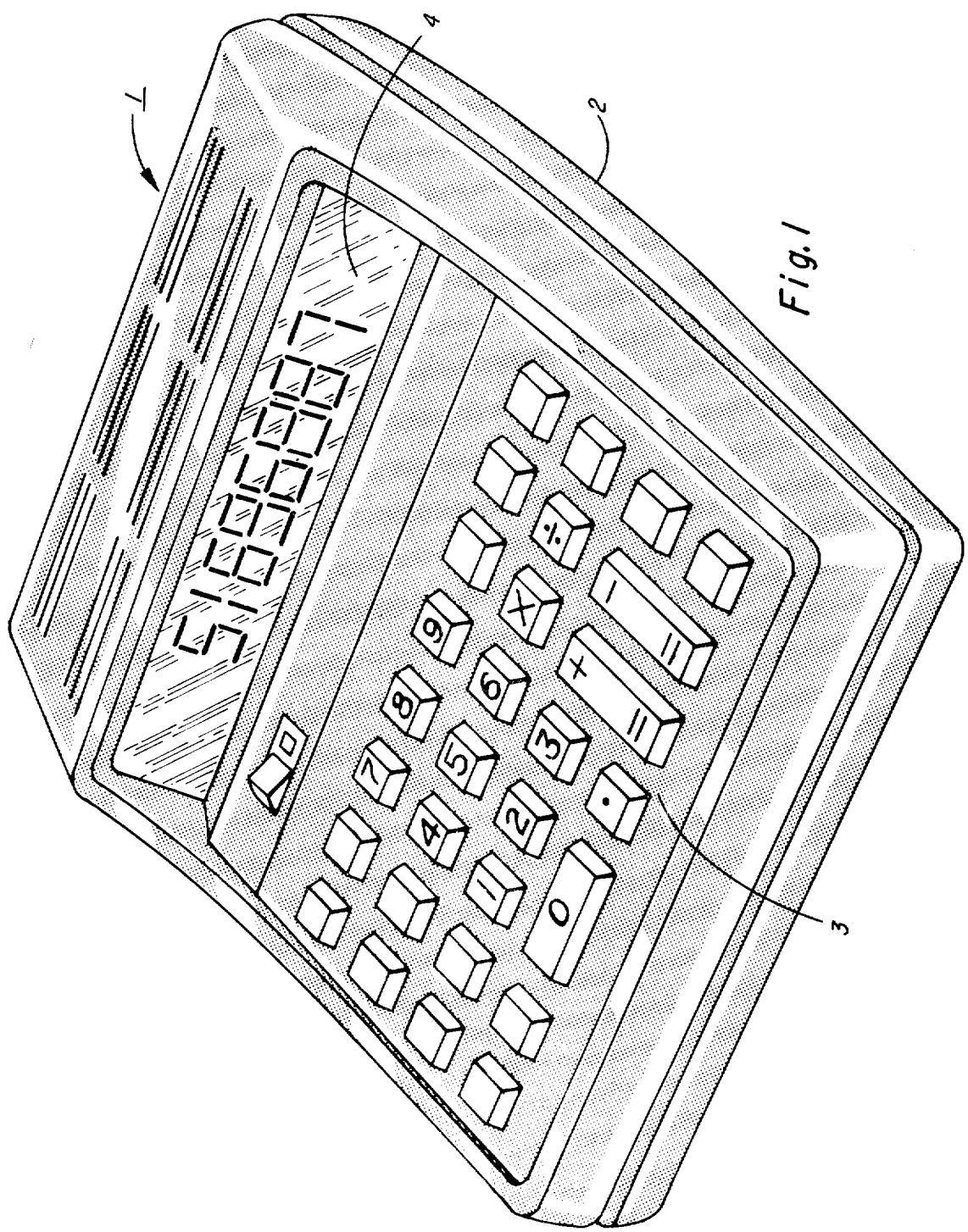
FIG. 1 is a pictorial view of an electronic desk top calculator which may employ the invention.
Figure 3B:
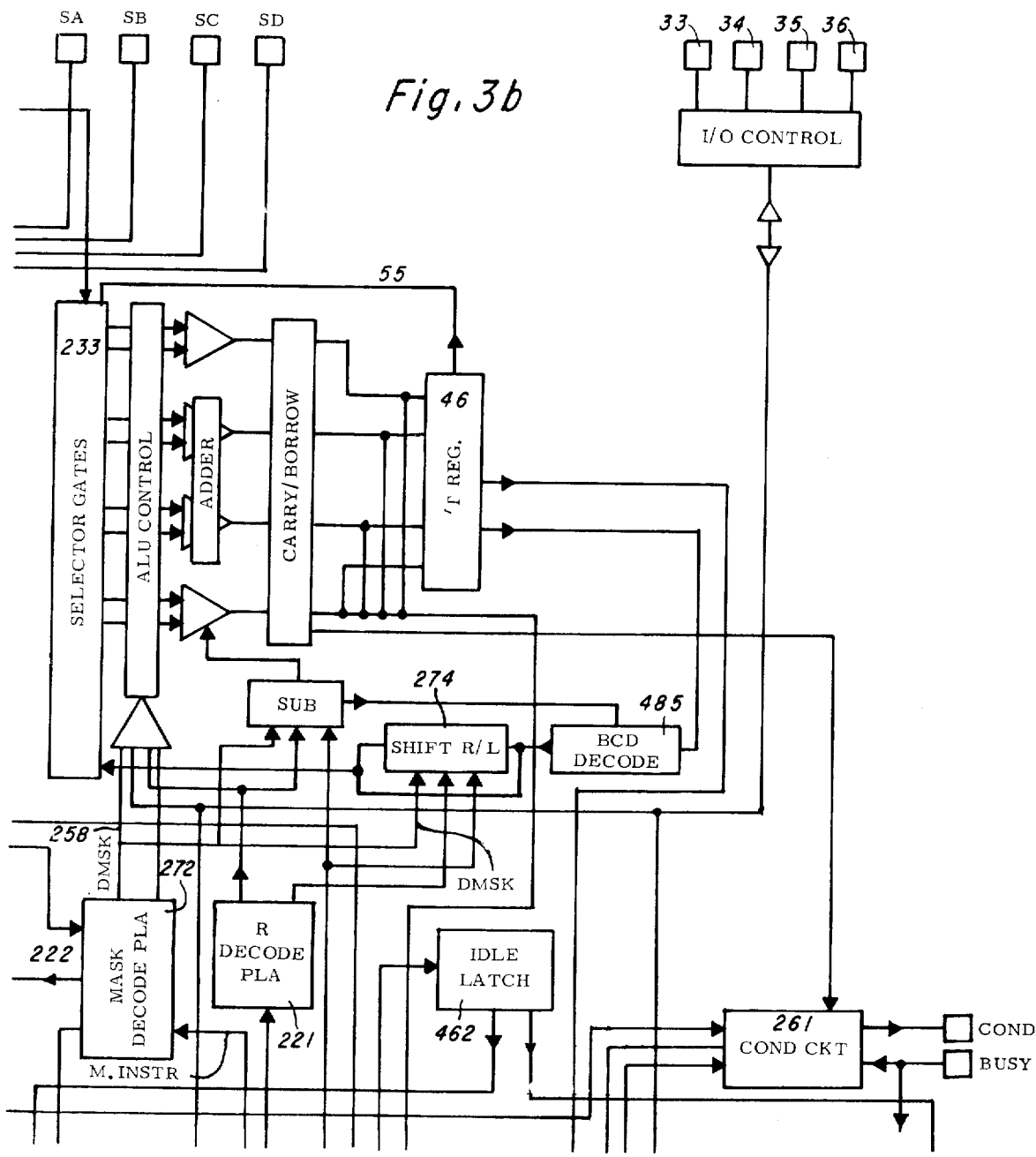
Figure 3C:
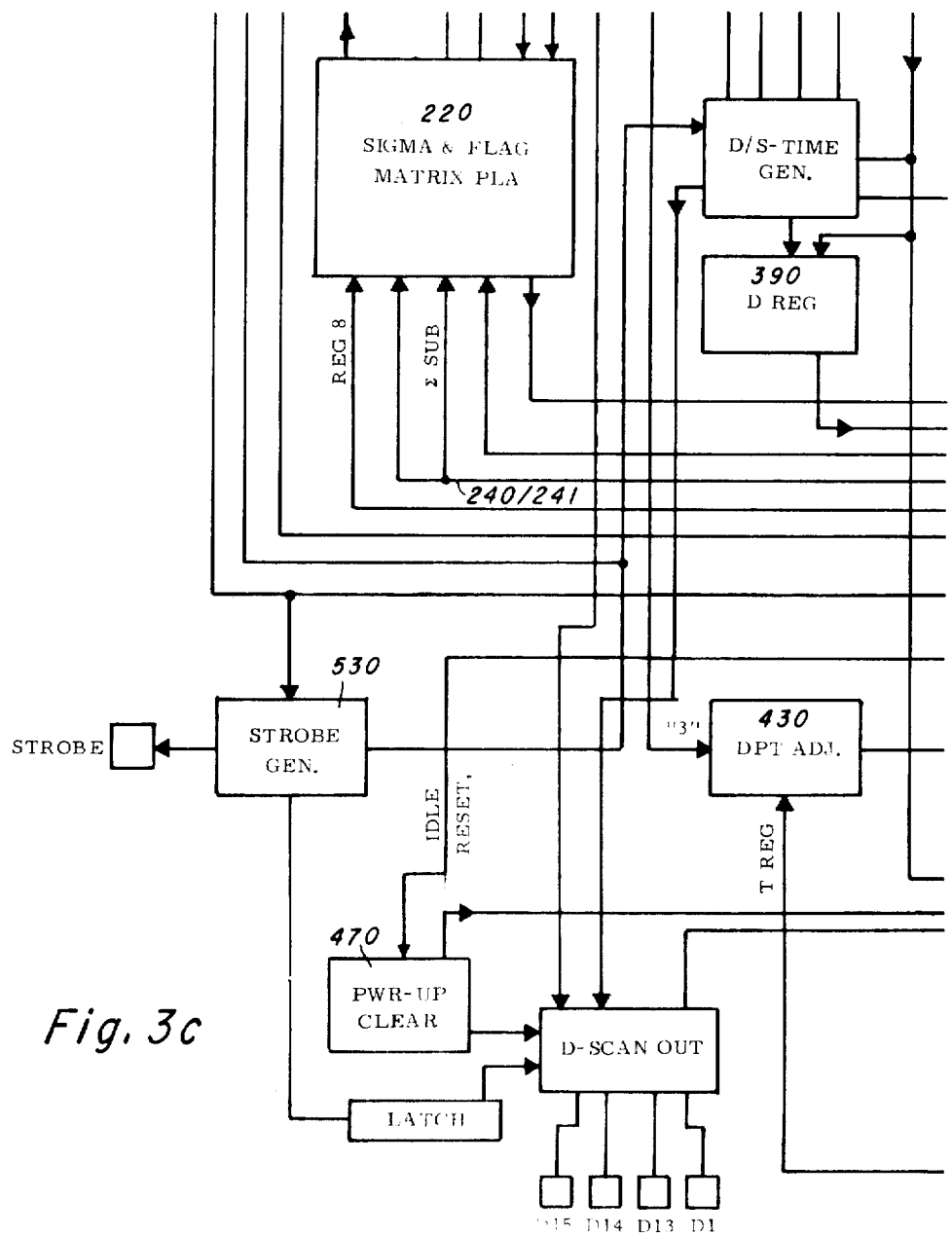
Figure 3D:
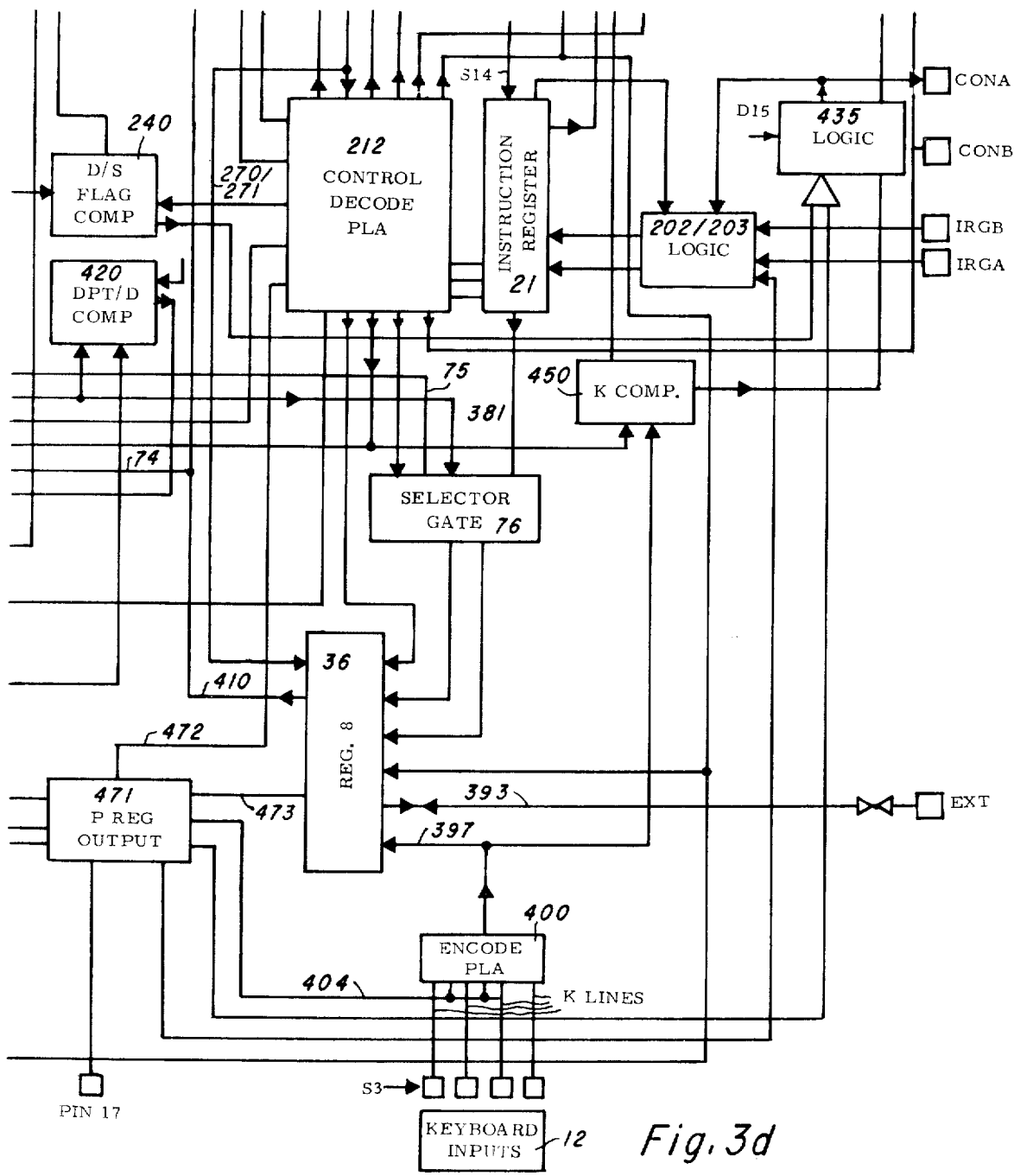

Referring to FIG. 1, an electronic calculator 1 of the type which may employ features of this invention is shown in pictorial form. The calculator 1 is contained within a small housing 2 and has a keyboard 3 and a display 4. The display 4 may consist of up to fifteen digits or characters, and may employ neon tubes, liquid crystal display units, arrays of light emitting diodes, or other display means. In a business type calculator, the display 4 may include twelve digits plus one or two annotator characters which show minus sign, entry error, overflow, memory indicator, etc. In a scientific calculator, the display may be ten digits plus a two digit exponent for scientific notation, in addition to annotators for a sign for both mantissa and exponent as well as overflow, entry error, etc. Ordinarily, each digit of the display 13 would be of the so-called seven-segment or eight-segment variety, with provision for indicating a decimal point and comma for each mantissa digit. The keyboard 3 includes the usual set of 10 decimal number keys one through nine plus a zero, and a decimal point key, along with 20 or so function keys, and 12 decimal point set keys or switches. Floating or fixed decimal point mode for the display 4 may be set by a thumb wheel, or a lever switch or set of switches. The function keys include functions such as plus equal ±, minus equal ≡, multiply X, divide ÷, clear all CA, clear entry CE, along with a large number of other functions. Data or numbers are entered by the number keys, and instructions are entered by the function keys; both number and function keys serve to call subroutines from an internal stored program to execute the desired entry or operation. Entries and intermediate and final results of calculations are indicated on the display 4. Generally, the construction and operation of the calculator may be introduced with the block diagram of FIG. 2, as reproduced and described in accordance with the above referenced copending application Ser. No. 360,984.

In FIG. 2, there is shown a functional block diagram of the expanded claculator system of this invention showing the data chip and ROM chip interconnected with the peripheral chips providing expanded calculator capacity. The data chip 5 generates a plurality of control signals to the ROM chip 6, to the external set of ROM/Register chips 7 of this invention, providing for both increased data word storage and increased instruction word storage capacity, to the external 10-register chip set 8, providing external data word storage capacity, to the external programmer chip 10, providing a means for programming specific subroutines into the calculator externally, and to external printer chips 9 for controlling output printers 11. The output printers 11 may be of conventional design with adaptions to the printer chip 9, but preferably are of the thermal printer type or the drum printer type.

The control signals generated by the data chip 5 include the control signals:

CONTROL A (CONA) or inhibit increment for indicating that an interrupt is desired in the normal sequencing of the ROM to allow additional executions by the system before the next instruction word is to be executed;

CONTROL B (CONB) is indicative of the idle condition of the data chip, i.e., whether the data chip is actually in the calculating mode (non-idle) or in the display mode (idle);

CONDITION (COND) indicates that a condition flag has been set indicating a comparison of the particular flags or desired digits of an instruction word;

FLAG A (FLGA) is the serial output of the flag register in the SAM at an output rate determined by COND;

STATE TIMES (S times) indicate the state timing (timing controlling data manipulation) of the data chip, 16 of which state times generate a D time;

DISPLAY TIMES (D times) indicate which set state times of the program the calculator is currently executing, wherein 16 S times constitute an instruction cycle, and the D times are generated in cycles of 15 so that D times precess from the particular D time of the preceding cycle;

KEYBOARD INPUTS (K lines) are signals from the keyboard for entering externally commands to the data chip;

P REGISTER (PREG) indicates that the data chip is addressing ROM storage and indicates which ROM storage area is being addressed;

INSTRUCTION WORDS ($I_0$-$I_{12}$) indicate the particular instruction word stored in a particular ROM instruction storage unit;

EXTERNAL (EXT) indicates that the external terminal on the data chip is either sending or receiving data;

STROBE (STBE) is a programmable signal determining the period of D times, herein preferably chosen as 15;

BUSY (BUSY) represents the condition of the printer as determined by the printer chip 9 that the printer is/is not busy and cannot/can receive another command for printing.

Referring again to FIG. 2, the data chip 5 provides output information from Register A and Flag Register A to the segment decoder 14. Such information is communicated as: position of the comma, position of the decimal point, actual data to be displayed from the A register, and data to be displayed from the Flag A Register. The segment decoder 14 is a conventional decode circuit for decoding the binary coded decimal output information for actuating the segment drivers 13. The segment drivers 13 comprise conventional driver circuits for actuating the above-mentioned displays 3, here shown to have a seven segment display per digit.

The data chip also provides D times to the digit drivers 12 for selectively scanning the digits of the display 3. Scanning of the display matrix is explained in detail in the above-mentioned application Ser. No. 420,999. The preferred embodiment herein disclosed provides a first set of D times from the data chip and a second set of D times from the ROM chip, which combination of sets comprise a fifteen D time cycle.

The data chip is responsive to the K information which is generated from the D time strobing of the keyboard input. This scanning of the keyboard is set forth subsequently in detail.

The ROM chip 6 is responsive to COND, CONA, PREG, STBE, IRGA, IRGB, and the S times signals from the data chip 5 and generates in response thereto the instruction word $I_0$-$I_{12}$, the D times, and IRGA and IRGB to the data chip.

The ROM/Register chip 7 of this invention allows expanded data and instruction word capacity. As later explained in detail, the ROM register chip is responsive to $I_0$-$I_{12}$ instruction words from the ROM, I/O information from the data chip, and S times, Flag A, STBE, CONA, CONB, PREG and COND command signals from the data chip.

The 10-register chip 8 is another set of peripheral chips providing expanded data storage capacity to the calculator system of this invention. The 10-register chip is responsive to Flag A, CONB, and I/O information from the data chip for providing recall data through the I/O lines in return to the data chip.

The printer chip 9 is responsive to the I/O information from the data chip, the external, CONB, Flag A, and STBE commands from the data chip for printing in accordance with data on the I/O lines.

For a better understanding of the ROM/Register chip, a detailed functional block diagram is shown in FIGS. 3a–3d and FIG. 4 of the data chip and ROM chip depicted in the calculator system of FIG. 2. The detailed description of the individual functional blocks as described in copending application Ser. No. 360,984 is hereby incorporated by reference as needed. The following description of generation of the relevant signals generated by the ROM and data chips is reproduced from the above referenced application as a convenience.

New instructions coming from the ROM 20 at times are desirously not entered into the instruction register 21. For example, if the data in the instruction register 21 is being recirculated, such as if the calculator is in a hold position, or if it is waiting for a particular D time for another instruction to be executed, first it is unnecessary for the ROM 20 to continue sending out instructions and secondly, new instructions from the ROM are desirously not entered. The condition signals, CONA and CONB, communication to external chips when instructions are to be entered and executed. CONA is normally utilized to provide a hold instruction. That is, whenever CONA is actuated, that instructs the ROM to stop incrementing instructions and for it to hold at the location it is. An example is during a keyboard scan requiring a complete D or instruction cycle.

On the standard programming of the two-chip system of this invention, the output of CONA is controlled by the presence of either a scan or a wait instruction from the instruction register. Either of these instructions is a command for the program counter 25 to stop incrementing at the particular ROM location until reactuated by the data chip. During the one state of CONA the instruction register on the data chip recirculates the particular instruction therein, which is either the wait or the scan instruction. The calculator stays in this recirculating loop until the presence of a $D_{15}$ signal which changes the state of CONA allowing entry into the instruction register of the next instruction coming from the ROM. An example of such a wait or scan function is when a complete scan of the keyboard is desired, a wait until $D_{15}$ is necessary. This is so that the scan is started on $D_0$ to assure scanning of all keyboard lines. Otherwise if a scan started at $D_{13}$ instead of $D_0$, remembering that the D times count backwards, a complete scan would comprise $D_{13}$–$D_0$–$D_{15}$, without scanning $D_{14}$. At time $D_{15}$ the calculator is kicked out of the wait/scan instruction as a hardware function at time $D_{15}$ and a new instruction word is executed.

The signal CONB communicates to external chips whether or not the data chips is in the "idle condition". In the idle condition, the calculator's outputs to the display terminals A1–A8 are actuated and the machine is awaiting further information. When the calculator is not in the idle mode, it is actually computing and the external display is blank. Thus, the CONB output will either be in a high or low state representing an idle or "not idle" condition. CONB is a function of the idle latch circuit 462, above discussed with respect to CONA, which is selectively coupled to CONB at $D_3\phi_2$ in combination with an instruction from the control decode matrix for changing the output state of CONB even when the calculator is not changing its idle condition actually. That is, the CONB instruction from the decode matrix is utilized to transport information or to communicate with other chips information other than idle/non-idle information.

The idle latch circuit 462 is responsive to the control decode PLA, and in particular to set idle or zero idle instructions. These instructions either set the idle latch or zero the idle latch which causes selective communication to the other chips of the idle state of the data chip.

CONB, in addition to indicating idle conditions of the calculator, also performs other functions. That is, if flag condition information is being sent to other chips, CONB is utilized to indicate at what rate the flag information is being sent. That is, whenever data is being displayed, i.e., the calculator is in the idle condition, the flags are being sent at the same timing rate as the register information, i.e., one particular flag is transmitted during each instruction cycle or D time. This enables the flag to actuate functions such as decimal points, minus signs, or commas depending upon the specific program.

When the calculator is not in an idle mode, and the CONB is in the other condition, the flags are being transmitted at state time rates; that is, one flag per state time or 16 flags per instruction cycle or D time. The flag during this time may be utilized to selectively actuate other chips depending on whether or not a particular figure flag is set. Therefore, CONB controls whether other chips will look at a particular flag by knowing whether or not the calculator is in idle.

The output of CONB will always occur at $S_0\phi_1$ if a CONB instruction or a zero idle instruction has been encountered. Therefore, another function of the CONB output is for synchronizing the other chips. That is, by coupling the external chips to monitor CONB, then after a power up clear routine is accomplished, a set CONB instruction provides a synchronizing information that the data chip is in a $S_0\phi_1$ state, and extra pins to communicate the same information is unneeded. Furthermore, by selective programming, CONB can be made to occur only at a particular D time, so that the occurrence of a particular CONB will synchronize not only the S times on the peripheral chips, but also the D times. This again provides considerable hardware advantages such as saving external pin interconnects, at only the expense of slight software manipulation.

The condition circuit 261 provides an output COND for providing to the ROM a conditional branch instruction. That is, if upon a particular test command the condition circuit or COND is set, then the ROM jumps to the location therein specified. If the condition circuit is not set, the next instruction word in sequence in the ROM is executed. For example, if the software routine requires a branch instruction if a particular flag is set, then at a particular time in the instruction cycle the flag is tested, and if the condition circuit is set in relationship to whether the flag was "set", then the ROM would branch to the location of the desired routine. If the condition circuit were not set with respect to the flag condition, then the next sequential instruction from the original ROM location would be executed.

The feature of a condition circuit and COND signal provides the machine the capacity of decision making dependent upon conditions which are under software control increasing versatility. Other software controlled conditions which may set or reset the condition latch circuit is the depression of a particular key on the keyboard input, setting the latch. In response to this particular setting of the condition latch when a keyboard key is depressed, the keyboard scan is terminated. The condition latch 261 is also set if during any add or subtract operation a carryout of the last digit of the register or a borrow out of the last digit is required. In other words, the condition circuit functions to indicate an overflow condition. The condition latch may also be set upon a particular "test flag" operation, wherein if the flag is set then the condition latch will also get set and conversely.

The input/output circuit labeled terminals 33–36 are used to both output data from registers in the SAM 23 to external chips and to input data from the external chips to the data chip. Whether or not data is being input or output and to which registers the data is channeled is under software control.

The four outputs labeled SA–SD provide four bit binary encoded state time information relating the particular state time, $S_0$–$S_{15}$, of the calculator. Terminals SA–SD may be coupled to any ROM chips 7 of the system having sufficient interconnect pins to receive the information. As earlier discussed, those chips not having the extra four pins to receive the SA–SD signals may monitor the CONB signal and utilize it as a sync signal in generating S and D times coincident with SA–SD.

Pin 16 is labeled a strobe output and provides a signal to external chips to indicate during which D time the calculator is operating. The ROM chip digital output buffers which provide D signals $D_2$–$D_{12}$ for scanning the keyboard and display are synchronized utilizing the strobe signal. Strobe occurs during a given state time and this occurrence changes during each instruction cycle or D time. As will be discussed later, D times actually precess by one state time, or count backwards, and accordingly the strobe circuit precesses by one state time. As earlier mentioned CONB may be utilized to sync the external chips if sufficient interconnect pins are not available. The separate strobe generator, however, is readily provided on the data chip and saves considerable software manipulation than if otherwise CONB had to be utilized. The strobe generator 530 producing the strobe signal may be programmed to provide a strobe signal so that a D time may be one instruction cycle in duration, as it is in the preferred embodiment herein described, or it may be programmed so that a D time is two, three, four or five instruction cycles in duration. This feature provides an extended D time to accommodate any display system having a high number of displays requiring a particularly large set of information to be transmitted thereto. In such a case, more than fifteen S times or one instruction cycle is required for complete execution of the information driving the display system.

The Flag A, FLGA, output indicated at pin 11 is utilized to convey particular conditions of the calculator. Flag A is under control of the CONB signal and may be utilized for communication to other chips while the calculator is actually in the not idle or computing mode. As earlier discussed, in the calculating or not idle mode, the flags appear at the Flag A output once every given S time. This particular flag information is communicated to other chips, for example, the ROM register chip, which in combination with the particular D time directs the ROM register chip to store the conveyed data in a particular ROM memory therein. By multiplexing data utilizing a particular flag/D time combination in this manner, only one flag is needed to convey and store the necessary information, and no other data chip output is required. In a similar manner, the ROM register external chip utilizes flag information for controlling which register therein is being accessed. Utilizing the flags in this way is a feature of this invention as an almost unlimited amount of expansion is possible with peripheral chips in combination with the data and ROM chip.

TIMING

The various S and D time expressions used in the above description are explained for convenience by reference to the following reproduction from Ser. No. 360,984.

Figure 6A:
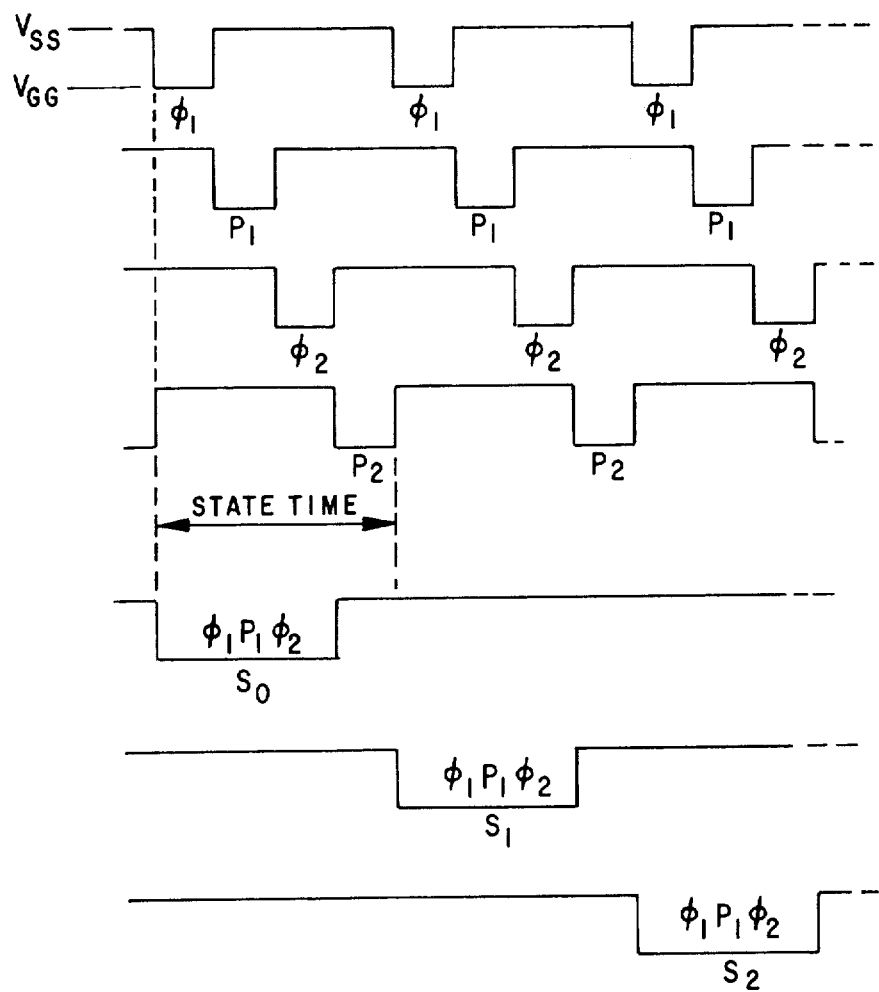
FIGS. 6a and 6b are timing diagrams showing the timing of various parts of the system of the invention.

The calculator system operates on two externally provided clocks $\phi_1$ and $\phi_2$ as seen in FIG. 6a and two internally generated clocks P1 and P2. The frequency used is 250 KHz for $\phi_1$, $\phi_2$. The clock generators may be conventional and are not shown herein.

Figure 6B:
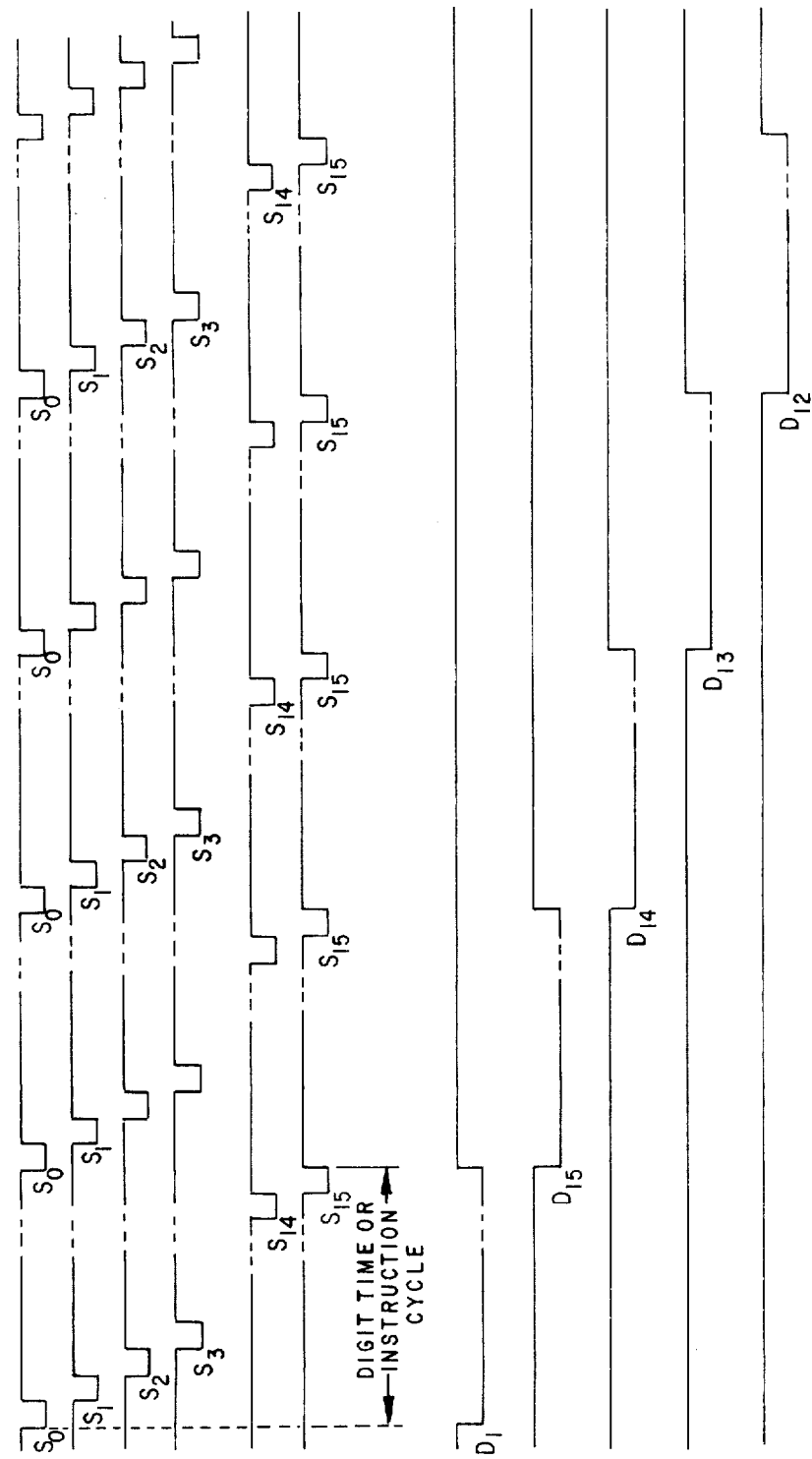

One set of clocks $\phi_1$, $P_1$, $\phi_2$, $P_2$ is referred to as a state time, and represents the time for one bit from each of the main registers A, B, C, D to be operated on in parallel by the ALU, etc. The BCD arithmetic used in the invention requires one full set of clock pulses for each digit, so 16 sets or state times are needed to perform arithmetic operations on all 16 digits in a register. Sixteen state times represent one D time or instruction cycle, as seen in FIG. 6b.

Individual address lines in the registers 23 are energized only for three of the clocks $\phi_1$, $P_1$, $\phi_2$, rather than all four; these groups of three are also referred to as state times S0 to S15 as seen in FIG. 6a. A feature of the invention is the use of the same state times as generated to operate the address lines of the SAM register 23 to operate or time the remainder of the system.

D times generated directly from state times S0–S15 are used to scan the keyboard and the display. As seen in FIG. 6b, the D times count down, D15, D14, D13 . . . D1, while the state times count up, S0, S1, S2 . . . S15; this feature aids in the zero suppression technique since leading zeros to be suppressed are on the left or MSD first while the ALU must operate from right to left or LSD first. There are fifteen D times and sixteen state times.

THE ROM/REGISTER CHIP

Figure 5:
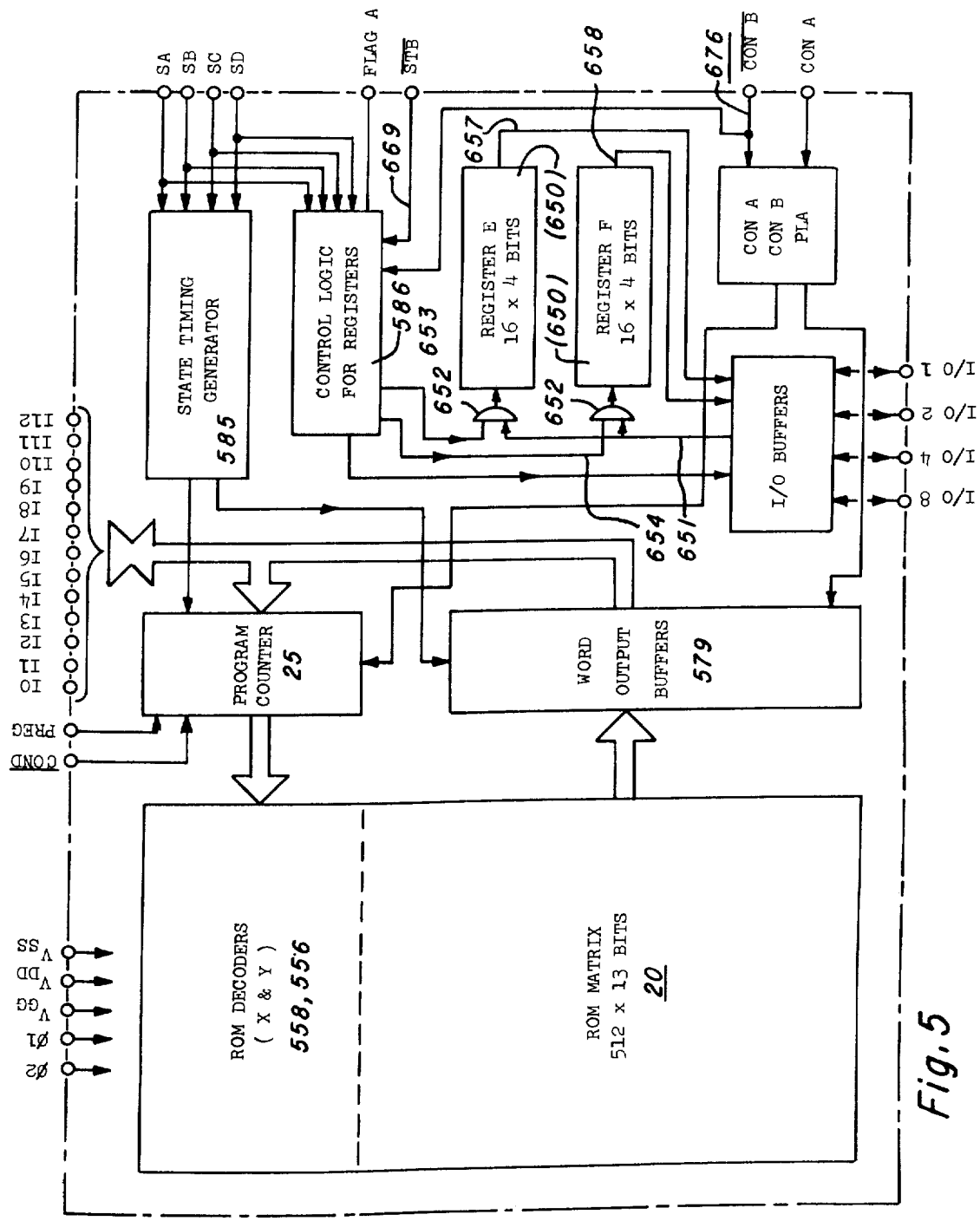
FIG. 5 is a detailed block diagram of the ROM/Register chip of this invention.

The ROM/Register chip of this invention is best described when viewing the detailed block diagram thereof as depicted in FIG. 5 in combination with the schematics as referenced in FIG. 4 and FIGS. 7a–7c. Like functions have like numbers in FIGS. 4, 5 and 7 for ease in understanding and for convenience.

Figure 7A:
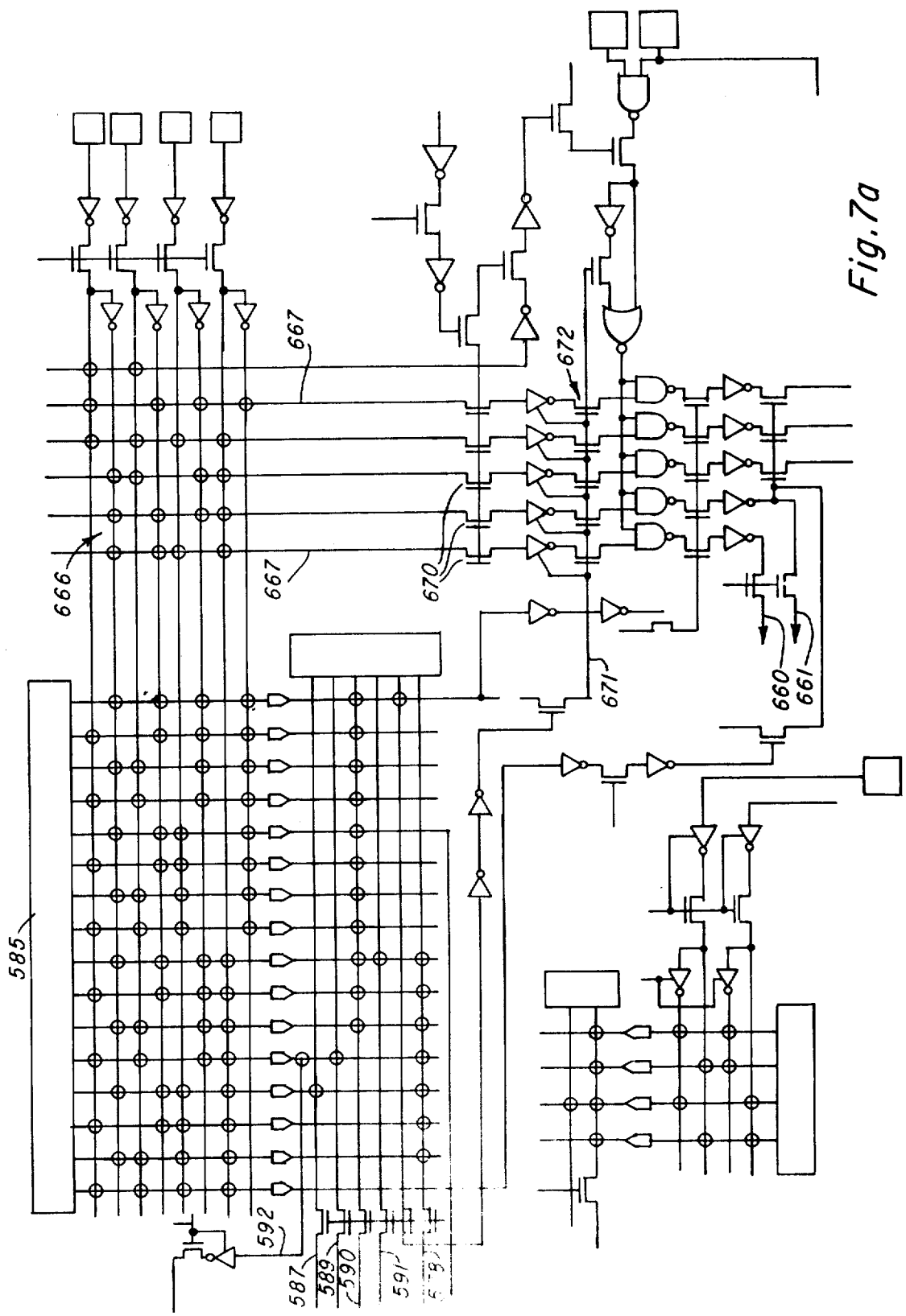
Figure 7C:
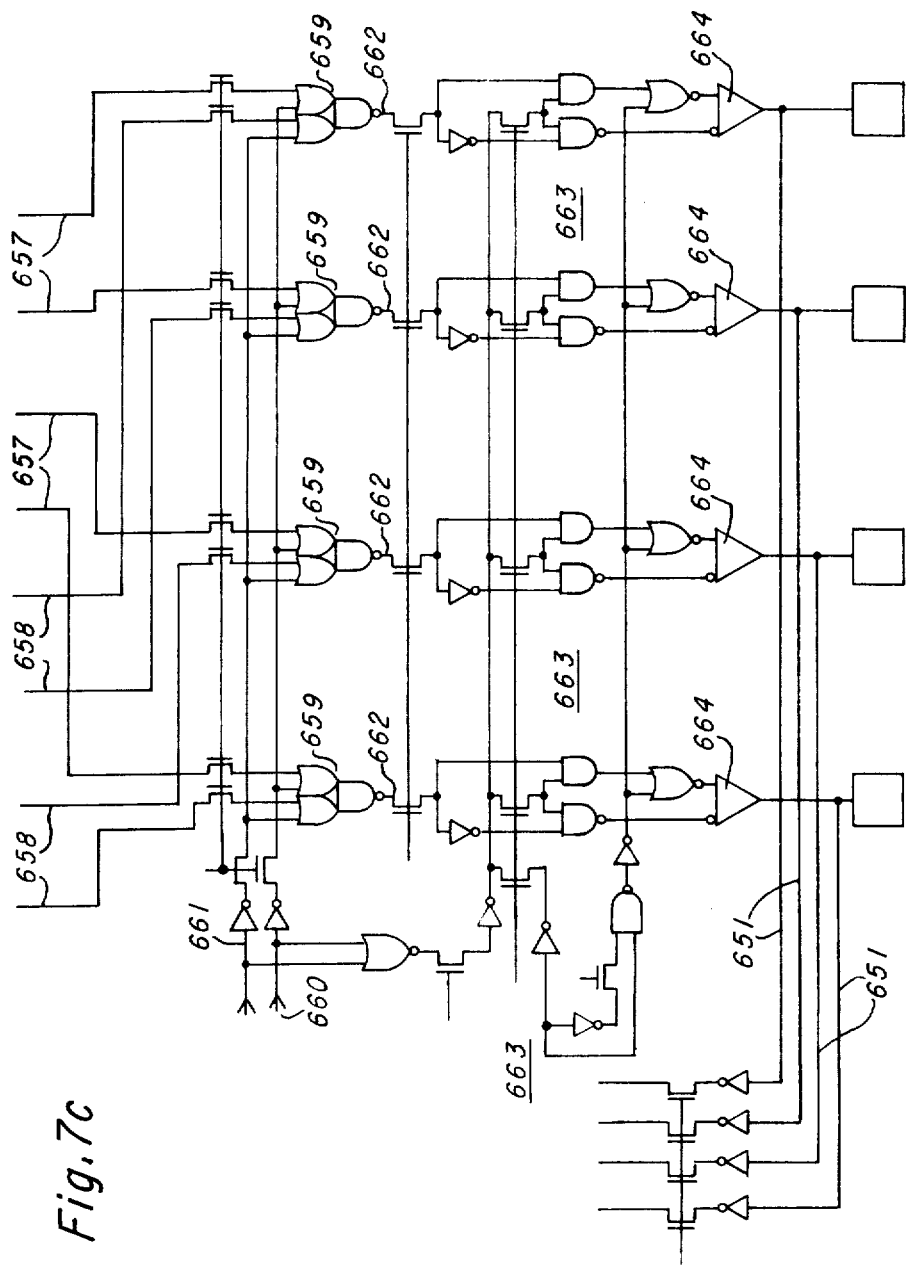
Figure 80:
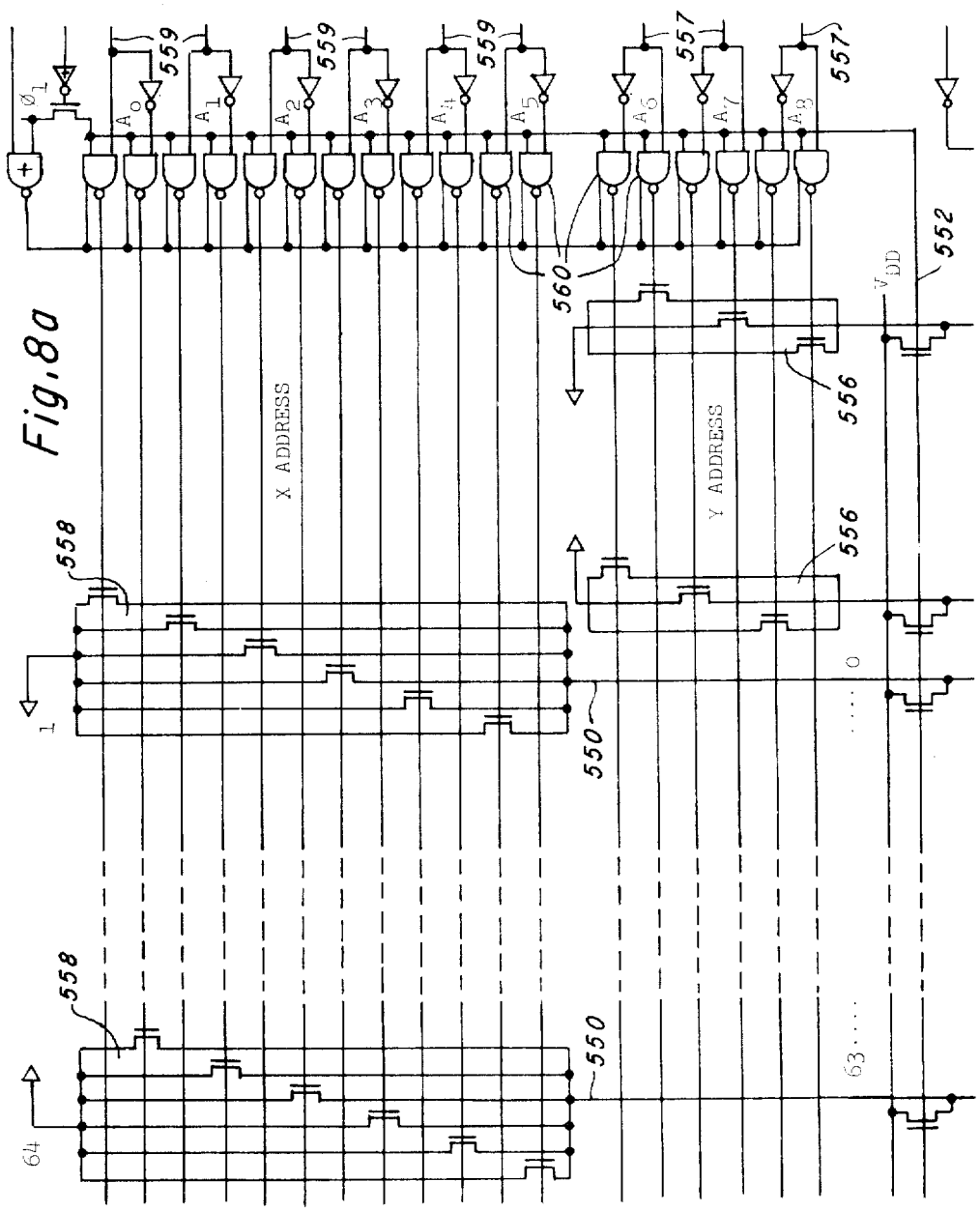
Figure 8B:
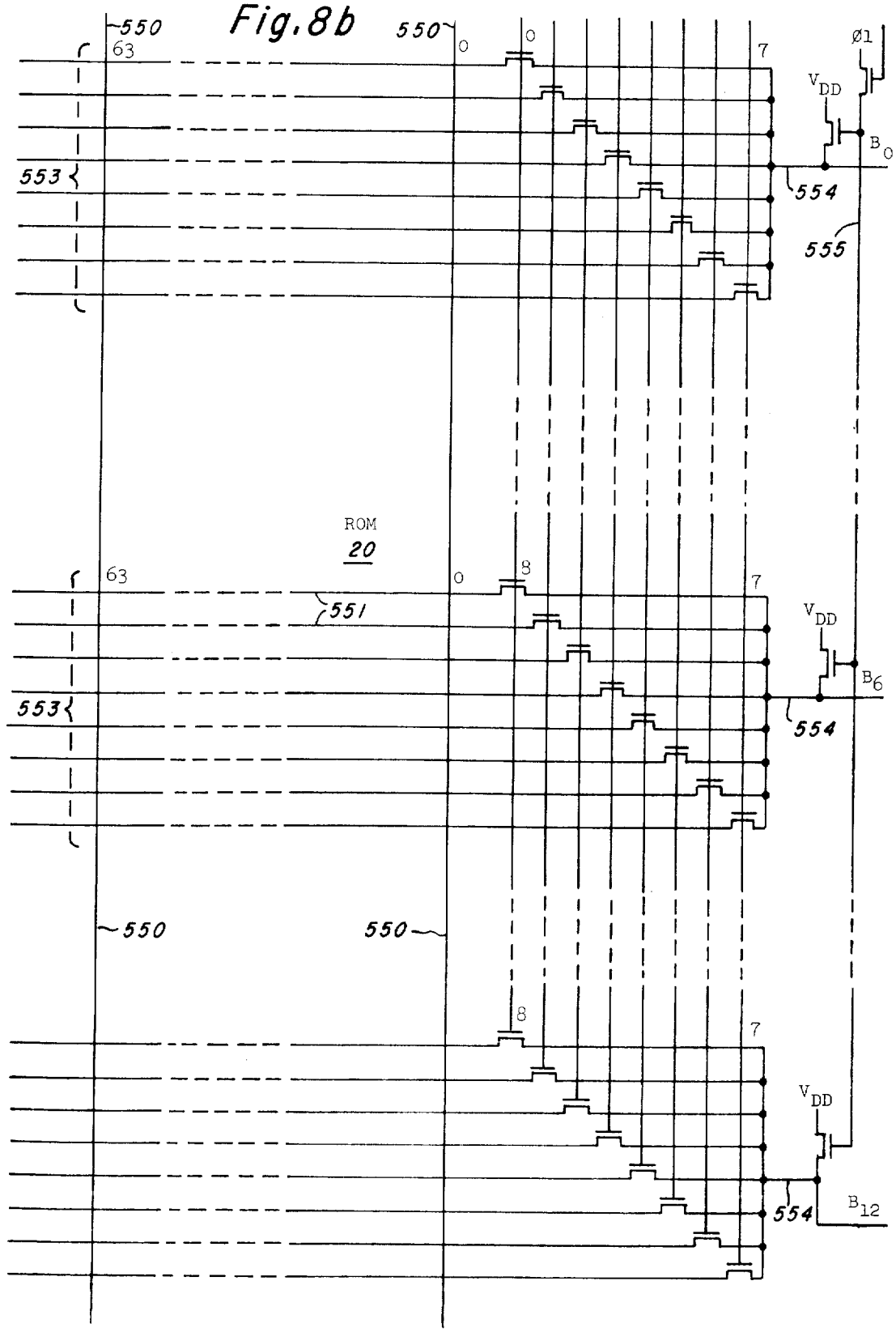
Figure 8C:
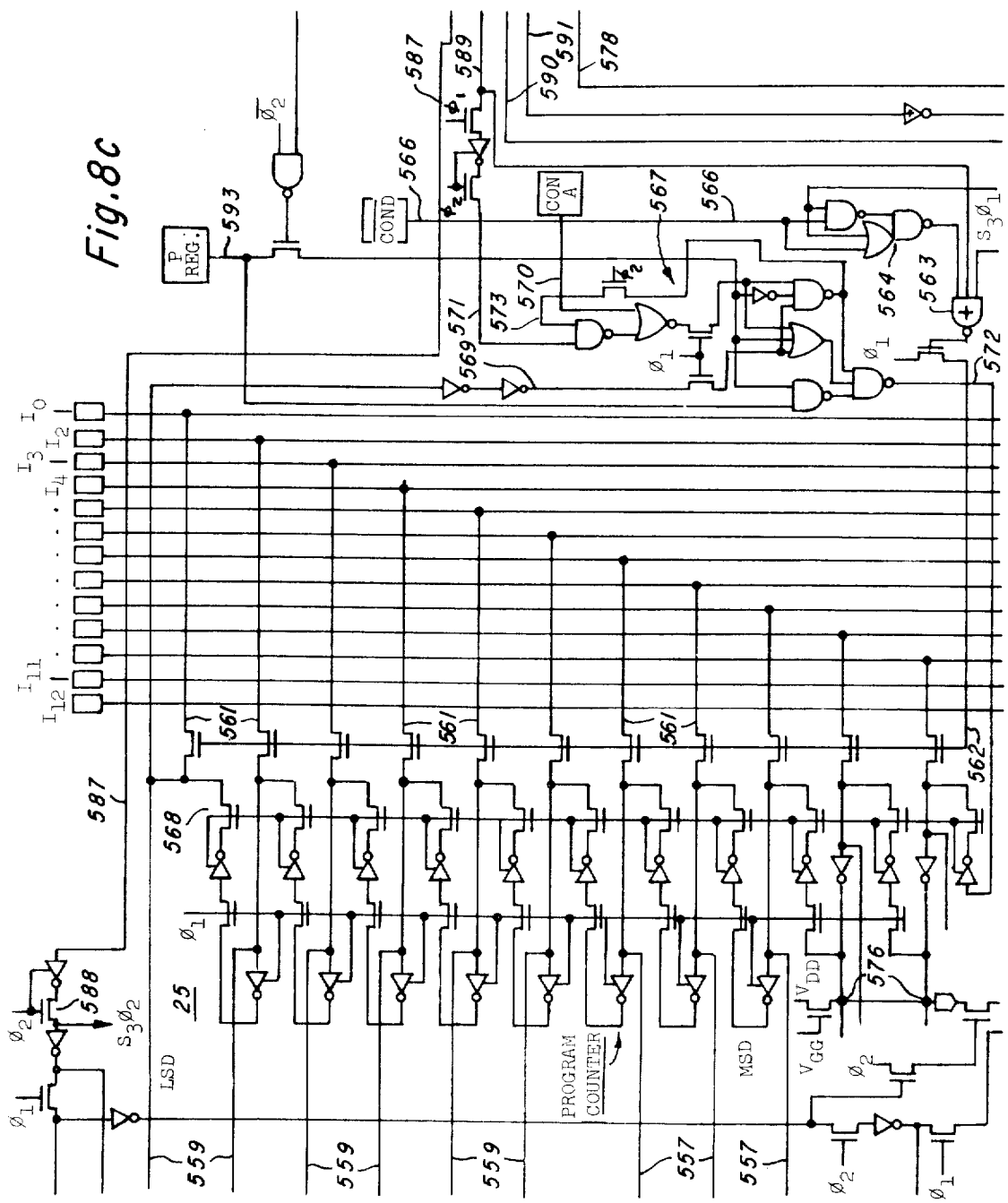
Figure 8D:
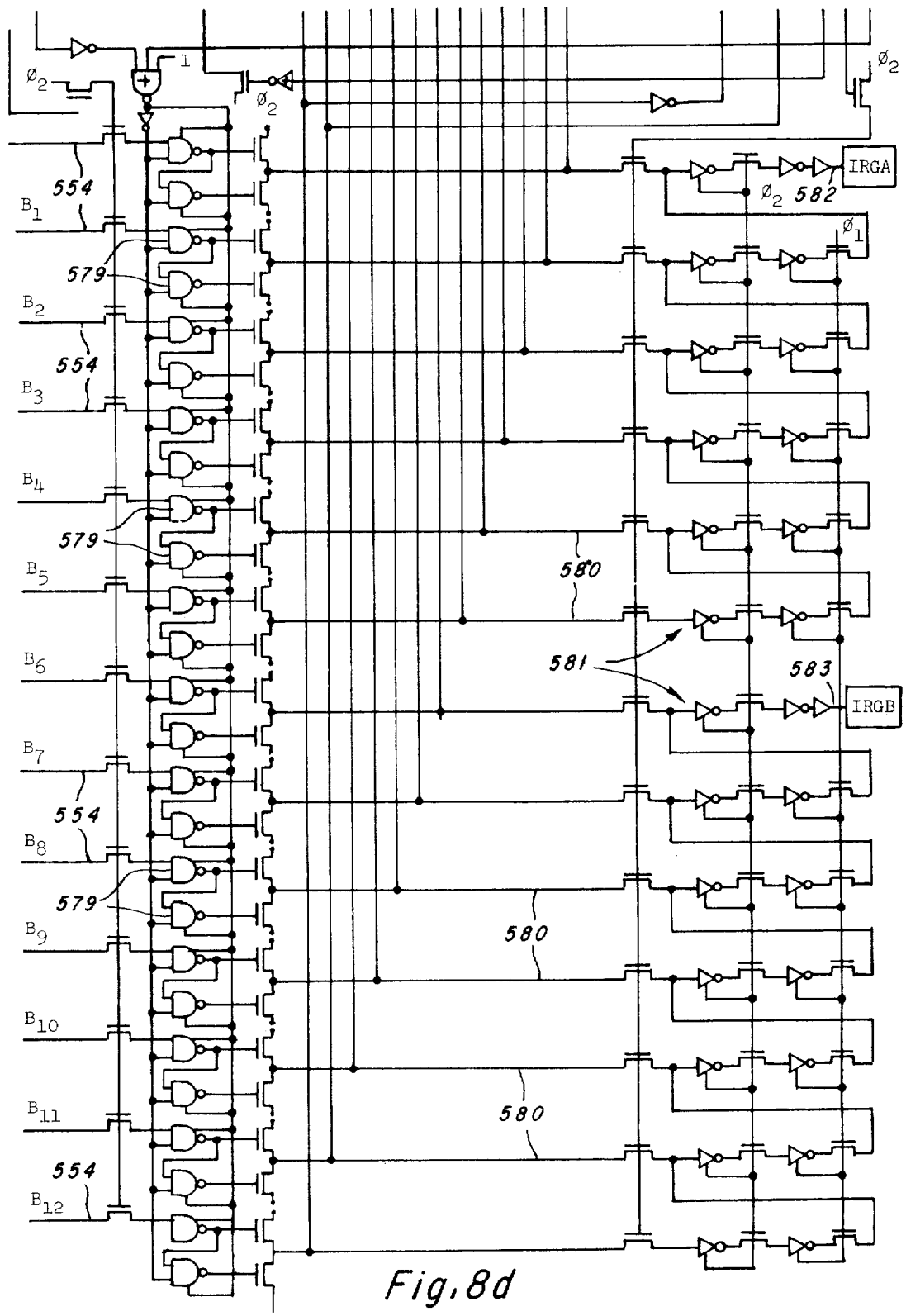
Figure 8E:
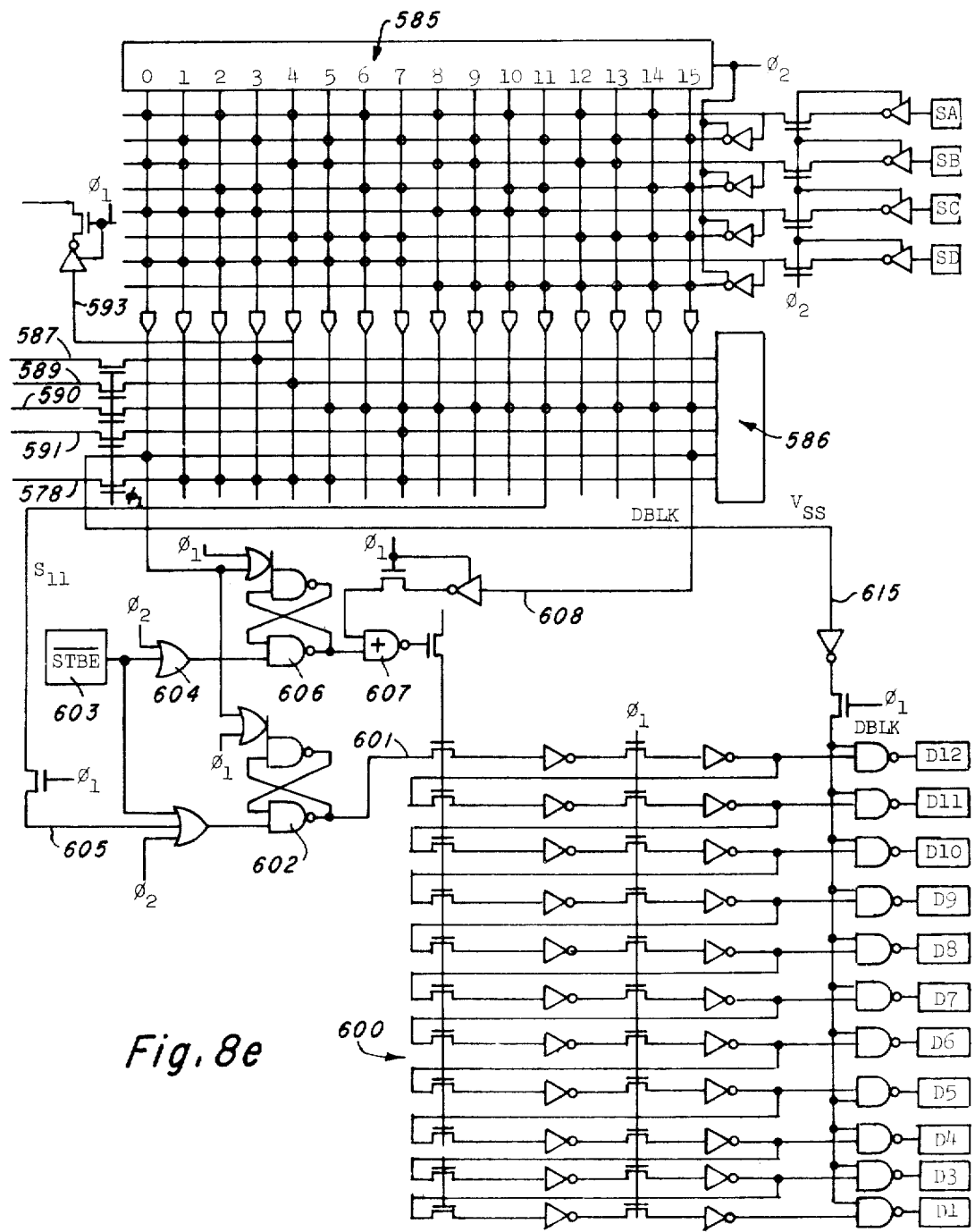

This chip is very similar to the ROM chip of FIG. 4 and includes most of the elements in the ROM chip shown in addition to what is shown in FIGS. 7a–7c. That is, the ROM/Register chip would include a ROM 20 made up of 6656 bits, X and Y address lines 550 and 551, X and Y address selectors 558 and 556, a program counter 25, input pads $I_0$–$I_{12}$, ROM output lines $B_0$–$B_{12}$, output buffers 579, a timing decoder 585, a matrix 586, and associated circuitry. The ROM/Register chip would not include an instruction register 581 because the one in the ROM chip itself would be used; that is, if a location in the ROM 20 of the ROM/Register chip of FIGS. 7a–7c were addressed, the selected instruction word would be read out of the output buffers 579 of the ROM/Register chip into the lines $I_0$–$I_{12}$ which are in common with the lines $I_0$–$I_{12}$ of the ROM chip, so the word would be read into the instruction register 581 of the ROM chip, and thence into the instruction register 21 in the data chip via the pads IRGA and IRGB. Also, the display scan shift register 600 of FIG. 4 need not be duplicated on the ROM/Register chip.

The ROM/Register chip includes all of the circuitry of FIGS. 4 (except the instruction register and display scan register, as just explained), plus the circuitry of FIGS. 7a–7c. Basically, this added circuitry consists of two 16 digit binary-coded-decimal registers E and F along with their associated control circuits and output circuits. The E and F registers are made up of shift registers 650, of which there are eight 16 state registers of conventional form. These registers are not composed of sequentially addressed random access cells like the SAM 23 in the data chip; instead, conventional recirculating stages are used. The stages of E1, E2, E4, etc. are not shown, but would be exactly like F8. A number to be read into the E or F registers would be fed into input lines 651 which are connected to I/O pads I/01 to I/08 (through inverters and $\phi_2$ clocked gates). The I/O pads are connected to I/O pads on the data chip. The data read out of the data chip and into the lines 651 would be serial by digit and parallel by bit. From the lines 651 the data could be written into either the E or F registers under control of gates 652. A register E write signal existing on an input 653 to the gates 652 for one instruction cycle causes the data on lines 651 to be written into the four parallel shift registers 650 which make up the E register. Similarly, a register F write signal on an input 654 causes the data in lines 651 to be written into the F register. When data is not being written into the E and F registers, the registers continuously recirculate via paths 655, but during a write in operation these paths are stopped by gates 652. One complete 16 bit recirculation is effected for each instruction cycle. The E and F registers may be cleared by adding in zeros, one digit at a time, under control of a clear all input 656 which is generated in the control portion of the ROM/Register chip as will be described later in reference to FIG. 7a.

The E and F registers 650 may be recalled or read out via lines 657 and 658, respectively. Each of the sets of output lines 657 and 658 include four lines for the one, two, four and eight bits of BCD code. As the registers 650 recirculate, the 16 digits in each register will appear in sequence on these lines 657 and 658, but the data will also remain in the recirculating shift registers until cleared or until new data is written in via lines 651.

Referring to FIG. 7c, output circuitry (I/O buffers) for the ROM/Register chip is illustrated. The data on read out lines 657 and 658 appears as input to selector gates 659, and the other inputs to these selector gates come from register E read and register F read, lines 660 and 661. Only one of these lines 660 or 661 can be actuated during a given instruction cycle, so either E register data or F register data will appear on outputs 662 from the selector gates 659. These outputs 662 are coupled through edge detector circuitry 663 to the I/O pads I/01 to I/04. The function of the edge detector is merely to assure that the output occurs at the proper clock time to be compatible with the remainder of the system, and so will not be described in detail. Output buffers 664 raise the levels to the extend needed to drive external wiring between the I/O pads on the ROM/Register chip and the same pads on the data chip.

In FIG. 7a the control circuitry 586 for the ROM/Register chip is shown. The purpose of the control arrangement is to generate one of five control signals: register E write on line 653; register F write on line 654; clear all on line 656; register E read on line 660; or register F read on line 661. This is done by using a combination of strobe times, S times and a flag. Encoded S times appear at pads $S_A$ to $S_D$, as generated within the data chip and conveyed out via lines 312. A decoder matrix 666 receives $S_A$ to $S_D$ as well as $\overline{S}_A$ to $\overline{S}_D$, to produce one of six outputs on lines 667. The matrix 666 may be coded in various ways, but as shown it will produce an output on the clear all line at $S_{14}$, on the register E write line at $S_0$, on the register F write line at $S_5$, on the register F read line at $S_7$, on the register E read line at $S_3$. Each of these will occur once every instruction cycle, but the signals on lines 667 will reach the lines 653, 654, 656, 660 or 661 only when coincident with a strobe and if a flag occurs also at the proper time. The flag/time combination, which will set up operation of this control circuit, is defined by a state-of-memory flag output produced at a line 668 from the decoder matrix 666; in the example, the Flag A must occur at $S_{12}$.

Inputs to the control circuitry 586 of FIG. 7a include a strobe line 669 which is connected to the strobe or $\overline{STB}$ pad on the data chip. As previously explained, the strobe occurs at certain times which count down or backwards; the strobe occurs at $S_{14}$ during one instruction cycle, at $S_{13}$ the next, $S_{12}$ the next, etc. The strobe exists for one state time occurring every 15th state time in a 16 state time instruction cycle. This strobe input 669 is gated into a set of five gates 670 so that the signals on the lines 667 only get through if they coincide with a strobe. The next input to the control circuitry is $S_0\phi_1$ on line 671 and gates 672. During each instruction cycle, if the strobe coincides with one of the times selected in the matrix 666, then one of the lines 667 through gate 670 will be actuated; however, this will occur at a particular S time, so the $S_0$ input 671 and gates 672 function to force the gate outputs into synch with D times or instruction cycles. That is, inputs to gates 673 are activated as follows: Recall E at D3, Recall F at D7, Store E at D0, Store F at D5, Clear All at D14, and State of Memory Flag at D12. The outputs from the gates 672 are communicated to a set of five gates 673 only if this flag occurs at a particular S time, chosen here as $S_{12}$ as established by line 668 in decode matrix 666. They are controlled by an occurrence of a flag from Flag A register in the data chip as it appears on input 674 at the chosen D time for selecting the desired function. This function of requiring coincidence is implemented by gates 675.

COND is zero when the data chip is in Idle, meaning when displaying. During this time, flags are used for displaying annotations such as overflow, minus sign, exponent sign, etc. These flags are stretched out a full D time in length. To prevent flags occurring during Idle or Display mode from erroneously addressing the chip, the $\overline{CONB}$ input 676 to gate 677 prevents Flag A signals from input 674 from reaching the gates 673. Outputs from the gates 673 are delayed until $S_{15}$ by a set of gates 678 which are clocked at $S_{15}$ via an input 679 from the $S_{15}$ line of the decode matrix 565; this functions to delay the occurrence of signals on lines 653, 654 et seq. until the next instruction cycle. The program for addressing the E and F registers employs four instruction cycles. The full table of instruction cycles and description thereof is in the above referenced copending application Ser. No. 420,999 which is incorporated here by reference. If data is to be read into the F register from the A register in the data chip, the first instruction is "Wait 6" which means that the system goes into a wait mode, nothing happening until time $D_6$ occurs; this is necessary because Store register F is programmed in the decode matrix to occur at $S_5$, and $D_5$ is going to coincide with the time that the strobe on line 669 occurs at $S_5$. The next instruction during $D_5$ is Set Flag Address, meaning a one is set in Flag A register at $S_{12}$ or digit 12; thus, during the cycle the flag will appear on input 674, the strobe will match up at $S_5$–$D_5$, and the chain for energizing line 654, register F write, will be set up during $D_5$. The next instruction from the ROM 20 on the ROM chip is "Register A to I/O" meaning the data in the A register will be applied one digit at a time to the I/O lines of the data chip, from whence it will appear on lines 651 of the ROM/Register chip, and thus it will be entered with the F register. The last instruction is "Zero Flag Address" meaning the address bit 12 in Flag A registers is zeroed. This completes the cycle. The sequence would be the same for Recall E register, for example, except that it would start with "Wait $D_4$" since Read E or Recall E is programmed for $S_3$ in matrix 666; also the third instruction would be "I/O to Register A" so the input/output lines on the data chip would be connected to feed data to the A register therein. Clear All could be done in three instructions, e.g., "Wait 15", "Set Flag Address at $S_{12}$", and "Zero Flag Address".

In FIGS. 8a–8e the specific circuitry of the ROM chip of FIG. 4 is reproduced from the above referenced copending case Ser. No. 420,999 to show a specific implementation of the ROM 20, program counter 25, decoder 585, matrix 586 and the other associated circuitry. It is therefore understood that respective circuitry from FIGS. 8a–8e is combined with FIGS. 7a–7c to provide a complete ROM/register chip according to this invention. Specific description of the specific circuitry on the ROM chip of FIG. 8 is hereby incorporated from the above referenced copending case.

It will be appreciated that the peripheral memory chip of the described calculator system according to this invention provides a means for adding external memory to a calculator system and also a method for addressing the external memory. By communicating a dedicated flag at a specific period in the calculator system timing, the external function associated therewith is enabled, such as a flag communicated at S12–D6 reads data into the F register. Such a technique enables addressing an external function with only one pin. That is the SA–SB timing signals are suitably and alternatively provided on the peripheral chip and synchronized with the master chip pair timing via a change of state of the CONB signal, as described in above referenced case Ser. No. 360,984. Such a technique is accordingly advantageous due to its minimum pin requirements.

Although specific embodiments of the present invention have been described herein, it will be apparent to a person skilled in the art that various modifications to the details of construction and method shown and described may be made without departing from the scope of the invention.

What is claimed is:

1. In a data processing system, implemented in at least one semiconductor chip having input means for entering data and functions, and control means for handling the data and functions, the improvement comprising:
    a. timing means, for providing timing signals;
    b. instruction memory means for storing instructions;
    c. flag generating means connected and responsive to the instruction memory means for selectively generating a flag signal;
    d. combining means connected to the timing means and to the flag generating means for combining the flag signal and any one of the timing signals into a unique store or read addressing signal; and
    e. auxiliary storage means connected to and responsive to the combining means for storing in the storage means the input data and functions in address locations determined by the unique store addressing signals and for reading out of the storage means the data and functions from address locations determined by the unique read addressing signals.

2. The improvement of claim 1 wherein the auxiliary storage means is further comprised of a plurality of storage locations, having addressing means responsive to the combining means for selecting one of the plurality of storage locations.

3. The improvement of claim 2 wherein the timing means provide a repetitive set of N cycles and M subcycles occurring during each of the N cycles, a selected one of the M subcycles from a selected one of the N cycles being combined with the flag signal to provide the addressing, storing and reading information.

4. The improvement of claim 1 wherein the system is a calculator having control signal generating means, responsive to the flag generating means, to the control means and to the instructions from the instruction memory means for providing one logic state indicating a first calculator activity and a second logic state indicating a second calculator activity.

5. The improvement of claim 3 wherein the system is a calculator having control signal generating means, responsive to the flag generating means to the control means and to the instructions from the instruction memory means for providing one logic state indicating a first calculator activity and a second logic state indicating a second calculator activity.

6. The improvement of claim 4 wherein the auxiliary storage means is further responsive to the control generating means for addressing, storing and reading data and functions.

7. The improvement of claim 5 wherein the auxiliary storage means is further responsive to the control generating means for addressing, storing and reading data and functions.

8. The improvement of claim 4 wherein the auxiliary storage means comprises at least one peripheral semiconductor chip having at least one auxiliary storage device located thereon.

9. The improvement of claim 7 wherein the auxiliary storage means comprises at least one peripheral semiconductor chip having at least one auxiliary storage device located thereon.

10. In a calculator system having instruction memory means with instructions stored therein, input means for receiving data and calculator function designations, control means for manipulating the instructions, data and function designations to obtain mathematical indications, auxiliary storage means, timing means for providing timing signals, and flag generating means for providing flag signals, the method of addressing the auxiliary storage means comprising the steps of:

a. generating a flag signal;
b. combining the flag signal with a desired timing signal to provide a unique store or read addressing signal; and
c. addressing the auxiliary storage means store or read.

* * * * *